3,481,929
**ALPHA-FLUORENYL AND ALPHA-FLUORENYLI-
DENE-p-TOLYL DERIVATIVES OF HETEROCY-
CLIC ALCOHOLS AND KETONES**
Edward M. Roberts, George P. Claxton, and Frances G.
Fallon, Cincinnati, Ohio, assignors to Richardson-Merrell Inc., New York, N.Y., a corporation of Delaware
No Drawing. Filed Feb. 21, 1967, Ser. No. 617,484
Int. Cl. C07d 29/12, 31/24; C09b 23/04
U.S. Cl. 260—240                              9 Claims

ABSTRACT OF THE DISCLOSURE

Novel compounds which have activity in inhibiting the clotting of blood. The compounds can be represented by the formula:

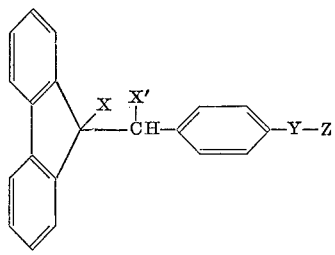

wherein each of X and X' is hydrogen or X and X' taken together form a bond between the carbon atoms to which they are attached; Y is an oxygenated carbon fragment chosen from

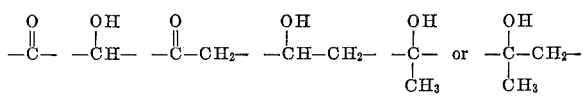

in which the carbon bearing the oxygen is attached to the phenyl ring; and Z is pyridyl or N-(lower alkyl)piperidyl attached to Y through a ring-carbon atom or a piperidyl group attached to Y through either a ring-carbon atom or the nitrogen atom; or pharmacologically acceptable acid addition salts thereof. Exemplifying this formula is the compound α-(α-fluoren-9-ylidene-p-tolyl) - 2 - pyridine-ethanol:

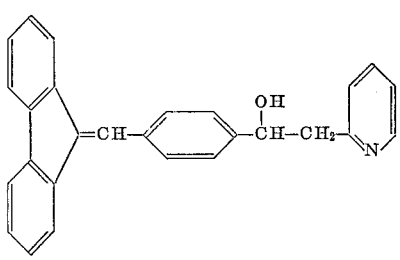

BRIEF SUMMARY OF THE INVENTION

This invention relates to novel fluorene compounds and processes for preparing them. More particularly, this invention relates to a series of α-fluoren-9-yl (and ylidene) toluenes substituted with a pyridyl or a piperidyl ring which is separated from the tolyl portion of the molecule by an oxygenated alkyl fragment of one, two or three carbon atoms and their non-toxic acid addition salts.

DETAILED DESCRIPTION

The compounds of this invention can be represented by the following formula

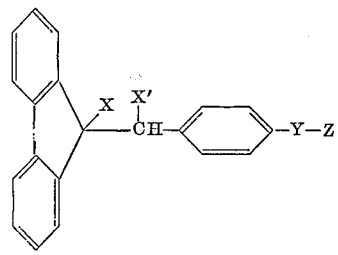

wherein each of X and X' is hydrogen or X and X' taken together form a bond between the carbon atoms to which they are attached; Y is an oxygenated carbon fragment chosen from

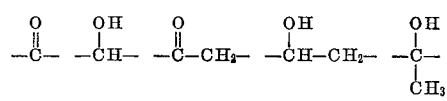

or

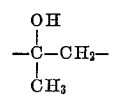

in which the carbon bearing the oxygen is always attached to the phenyl ring; and Z is a pyridyl or N-(lower alkyl) piperidyl attached to Y through a ring-carbon atom, or piperidyl attached to Y through either a ring-carbon atom or the nitrogen atom; or pharmaceutically acceptable acid addition salts thereof. Since, in the above generic formula, there can be a single bond to form α-fluoren-9-yl toluene compounds (when X and X' are each hydrogen) or a double bond to form α-fluoren-9-ylidene toluene compounds (when X and X' taken together form a bond between the carbon atoms to which they are attached) these two types of compounds can be represented by the following formulas, respectively, wherein Y and Z have the same meaning as above.

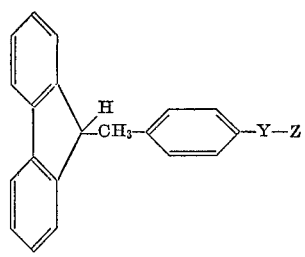

The term (lower alkyl) as used herein refers to alkyl having from 1 to 4 carbon atoms, e.g., methyl, ethyl, propyl, etc.

Illustrative of compounds of this invetnion there can be mentioned:

α-(α-fluoren-9-yl-p-tolyl)-2-pyridineethanol;
α-(α-fluoren-9-yl-p-tolyl)-α-methyl-2-pyridineethanol;
α-(α-fluoren-9-yl-p-tolyl)-4-pyridineethanol;
α-(α-fluoren-9-yl-p-tolyl)-3-pyridineethanol;
α-(α-fluoren-9-yl-p-tolyl)-2-piperidineethanol;
α-(α-fluoren-9-yl-p-tolyl)-4-piperidineethanol;
α-(α-fluoren-9-yl-p-tolyl)-1-methyl-4-piperidineethanol;
α-(α-fluoren-9-yl-p-tolyl)-1-methyl-2-piperidineethanol;
2-[p-(fluoren-9-ylmethyl)phenacyl]pyridine;
3-[p-(fluoren-9-ylmethyl)phenacyl]pyridine;
4-[p-(fluoren-9-ylmethyl)phenacyl]pyridine;
2-[p-(fluoren-9-ylmethyl)phenacyl]piperidine;
4-[p-(fluoren-9-ylmethyl)phenacyl]-N-ethylpiperidine;
2-[p-(fluoren-9-ylidenylmethyl)-phenacyl]pyridine;
3-[p-(fluoren-9-ylidenylmethyl)phenacyl]pyridine;
α-(α-fluoren-9-ylidene-p-tolyl)-2-pyridineethanol;
α-(α-fluoren-9-ylidene-p-tolyl)-4-pyridineethanol;
α-[α-(fluoren-9-ylidene-p-tolyl)]-α-methyl-2-pyridineethanol;
1-[p-(fluoren-9-ylidenylmethyl)phenacyl]piperidine;
2-[p-(fluoren-9-ylidenylmethyl)phenacyl]piperidine;
α-(α-fluoren-9-ylidene-p-tolyl)-2-piperidineethanol;
α-(α-fluoren-9-ylidene-p-tolyl)-1-piperidineethanol;
α-(α-fluoren-9-ylidene-p-tolyl)-α-methyl-2-piperidineethanol;
α-(α-fluoren-9-ylidene-p-tolyl)-1-methyl-3-piperidineethanol;
3-[p-(fluoren-9-ylidenylmethyl)phenacyl]-N-methylpiperidine;
2-[p-(fluoren-9-ylmethyl)-benzoyl]pyridine;
3-[p-(fluoren-9-ylmethyl)benzoyl]piperidine;
3-[p-(fluoren-9-ylmethyl)benzoyl]-N-methylpiperidine;

and the like.

The pharmacologically acceptable acid addition salts of the fluorene compounds of this invention can be those of inorganic or organic acids. Illustrative of inorganic acids there can be mentioned: hydrochloric acid; hydrobromic acid; sulfuric acid; phosphoric acid; and the like. Illustrative of organic acids there can be mentioned: lactic acid; pyruvic acid; oxalic acid; malonic acid; succinic acid; maleic acid; tartaric acid malic acid; citric acid; and the like.

The novel compounds of this invention (or their pharmacologically acceptable acid addition salts) are anticoagulants. They have been found to prolong clotting time of blood when administered orally or parenterally and to inhibit platelet aggregation, such as that induced by the addition of adenosine diphosphate, when added to samples of platelet-rich plasma. These can be administered over a wide dosage range, e.g., daily dosages from about 100 to 3,000 milligrams per kilogram of animal body weight daily by the oral route or somewhat less when administered parenterally. They may find particular utility in the treatment of thrombotic disease, especially of the arterial system, e.g., to inhibit thrombosis of the coronary or cerebral arteries. These anticoagulants can be administered in unit dosage form, e.g., together with a significant quantity of a pharmaceutical carrier containing from about 50 to 500 milligrams of the anticoagulant. These anticoagulants generally show little, and in some cases, an absence of, hypotensive activity or release of undesirable and potentially pro-coagulant factor (Platelet Factor 3) from blood platelets.

The compounds of this invention may be obtained by the treatment of a hetero-organometallic compound with α-fluoren-9-ylidene-p-tolunitrile or a compound derived from α-fluoren-9-ylidene-p-tolunitrile. Illustrative of such reactions are Reactions 2, 3, 6 and 8, shown in the appended reaction scheme, Table I, where 2-pocolyl lithium is used to exemplify hetero-organometallic compounds. Illustrative of useful hetero-organometallic compounds are pyridyl, pocolyl and N-methylpipecolyl magnesium halides as well as pyridyl, picolyl and N-methylpipecolyl lithium and sodium derivatives. Useful derivatives of α-fluoren-9-ylidene-p-tolunitrile include α-fluoren-9-ylidene-p-tolualdehyde (from the Stephen reduction of the nitrile, Reaction 5), 4'-fluoren-9-ylidenylmethylacetophenone (from the Grignard reaction between methyl magnesium halide and the nitrile, Reaction 1), and α-fluoren-9-yl-p-tolunitrile (from the catalytic hydrogenation of the nitrile, Reaction 7). Preferred solvents and temperatures for the organometallic condensations are:

(1) for the picolyl lithium and pyridyl lithium condensations, toluene or benzene (at −60° to 80° C.) after the organometallic reagent is pre-formed in absolute ether solution.

(2) for the picolyl sodium condensations, the corresponding picoline at 0° to 100° C.

(3) for the Grignard condensations, tetrahydrofuran or absolute ether at −30° C. to reflux temperatures.

Examples arising from the condensation of a hetero-organometallic compound with a nitrile such as α-fluoren-9-ylidene-p-tolunitrile or α-fluoren-9-yl-p-tolunitrile (Reactions 3 and 8) are obtained by hydrolysis of the resulting intermediate imine, with or without its actual isolation. The intermediate imine is mixed with dilute mineral acid at 25°–100° C. to give examples where Y is a carbon fragment bearing a carbonyl oxygen—for instance 2-[p-(fluoren-9-ylidenylmethyl)phenacyl]pyridine.

Examples bearing a piperidyl substituent may be obtained by use of an N-methylpipecolyl magnesium halide, or the analogous sodium or lithium derivative, or by a platinum or Raney nickel actalyzed hydrogenation of the corresponding pyridine derivative at 20 to 80° C. and 1 to 6 atmospheres of hydrogen pressure. Suitable pyridine derivatives and solvent systems for such hydrogenations are (1) quaternary N-methylpyridinium derivatives which may be hydrogenated in dimethylformamide solution, acetic acid solution or a low molecular weight alcohol solution to give N-methyl piperidine examples, (2) examples where Z is 2-, 3-, or 4-pyridyl in acetic acid solution or in either of the other mentioned solvent systems plus an acidifying agent such as dilute mineral acid, or (3) acid addition salts of examples where Z is 2-, 3-, or 4-pyridyl in any of the above solvent systems.

Examples where Z is piperidyl, attached through the ring-nitrogen atom, are obtained (Reaction 11) by mixing piperidine with 4'-fluoren-9-ylidenylmethylphenacyl bromide in an inert solvent such as benzene, toluene ether, alkanes of 5–7 carbon atoms, or combinations of these and allowing the reaction to proceed at 20°–80° C. The latter reactant is obtained by bromination of the aforementioned 4'-fluoren-9-ylidenylmethylacetophenone in chloroform-ethyl acetate solution with cupric bromide (Reaction 10). The above reaction between piperidine and the described phenacyl bromide yields the specific example where Y is

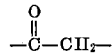

and Z is 1-piperidyl. Other examples may be obtained by reduction of the ketone function in Y to a hydroxyl function (Reaction 12) with sodium borohydride, lithium aluminum hydride or methyl magnesium halide. Thus, the examples where Y is

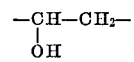

or

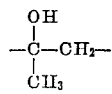

and Z is 1-piperidyl are obtained. Particularly useful in the above reduction is sodium borohydride which may be added as a solid or in solutions of water, tetrahydrofuran or low molecular weight alcohols to the keto-compound as the free base or acid-addition salt in any of the aforementioned solvents or combinations of them.

The conversion of examples where Y is

or

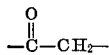

to examples where Y is

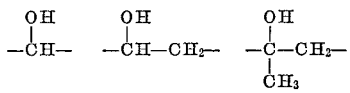

by the reduction reactions just discussed for cases where Z is 1-piperidyl is general and may also be applied to examples where Z is 2-, 3-, or 4-pyridyl, 2-, 3-, or 4-piperidyl and N-lower-alkyl-2-, 3-, or 4-piperidyl (Reactions 4 and 9). The exceptions to this general rule are where Y is

and Z is 2-pyridyl. The ketone function of Y is largely enolized in these cases and resists attack with Grignard reagents such as methyl magnesium chloride although it is still readily reduced with sodium borohydride or lithium aluminum hydride. This resistance to attack by Grignard reagents is readily circumvented however, simply by reversing the order of the organometallic condensation steps. Thus, as described in the experimental section, α-fluoren-9-ylidene-p-tolunitrile condenses readily with methyl magnesium chloride to give 4′-fluoren-9-ylidenylmethylacetophenone which in turn condenses with 2-picolyl lithium to give examples where Y—Z is

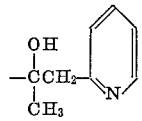

(Reactions 1 and 2)

The following examples are illustrative of the invention. The α-fluoren-9-ylidene-p-tolunitrile, M.P. 150–151° C., described by M. Kuna and M. J. Kopac, Ann. N. Y. Acad. Sci. 58(3) 261–292 (1954), and R. E. Allen, E. L. Schumann, W. C. Day and M. G. Van Campen, Jr., J. Am. Chem. Soc. 80 591–598 (1958), was used as the starting material for the preparations described hereinbelow.

EXAMPLE 1

α-fluoren-9-yl-p-tolunitrile

A solution of 100 g. of α-fluoren-9-ylidene-p-tolunitrile in 600 ml. of dimethylformamide was shaken on a Parr hydrogenation apparatus under 50 p.s.i. hydrogen pressure in the presence of 3.0 g. of palladium-on-charcoal catalyst. Hydrogen uptake slowed markedly or ceased after about 30 minutes when the fall in hydrogen pressure was approximately equal to the theoretical fall, calculated for the uptake of one molar-equivalent of hydrogen. The catalyst was removed by filtration. Concentration of the filtrate with a rotary-evaporator, on a steam bath, under vacuum gave a solution which on cooling yielded 73 g. of crystalline α-fluoren-9-yl-p-tolunitrile, M.P. 170–172.5° C. (M.P. 170–172° C. after recrystallization from benzene).

EXAMPLE 2

4′-fluoren-9-ylidenylmethylacetophenone

A solution of 82.0 g. of methyl iodide in 50 ml. of absolute ether was added dropwise to a vigorously stirred mixture of 18.25 g. of magnesium turnings and 1 liter of absolute ether over a 2.5 hour period. The reaction mixture was then refluxed one hour to give the Grignard reagent, methyl magnesium iodide. One liter of dry toluene was added to the reagent solution, and the ether was boiled off. A hot solution of 100.0 g. of α-fluoren-9-ylidene-p-tolunitrile in 2 liters of dry toluene was added rapidly to the toluene solution of the Grignard reagent. After being refluxed for two hours, the reaction mixture was carefully treated with 1 liter of 10% hydrochloric acid to decompose the metal complexes and allowed to stand for phase separation. The clear, amber toluene solution was washed several times with water, dried, decolorized with charcoal, filtered and evaporated under reduced pressure on the steam bath. The resultant residue was dissolved in 140 ml. of hot acetonitrile and allowed to crystallize in the cold. Yield: 83.1 g. of crude 4′-fluoren-9-ylidenylmethylacetophenone, M.P. 114.5–119.5° C. Two additional recrystallizations from 140 ml. of acetonitrile gave 75.0 g. of material, M.P. unchanged. The material is sufficiently pure for subsequent use as an intermediate. Further purification to give a product with M.P. 118–121.5° C. can be effected by chromatographing on alumina with benzene and methylene chloride as eluants.

EXAMPLE 3

α-fluoren-9-ylidene-p-tolualdehyde

Anhydrous stannous chloride was freshly prepared for this reduction by stirring 226 g. of stannous chloride dihydrate with 208 g. of acetic anhydride for two hours with ice-water cooling for the first few minutes as needed. The anhydrous stannous chloride was collected by vacuum filtration and washed with absolute ether. It may be stored in a vacuum desiccator for use over several days. The entire yield of anhydrous stannous chloride was placed in a 3-liter, three-necked round-bottom flask, equipped with stirred, dropping funnel, calcium chloride-protected vent, and a gas-inlet tube extending near the bottom of the flask. The material was covered with 400 ml. of absolute ether plus 500 ml. of chloroform. Dry hydrogen chloride gas was bubbled into the stirred suspension slowly through the gas-inlet tube for 4.5 hours to saturate the system. A solution of 100 g. of α-fluoren-9-ylidene-p-tolunitrile in 600 ml. of chloroform was added rapidly. The slow introduction of dry hydrogen chloride gas was continued for an additional 2–3 hours. Stirring was continued for an additional hour after the introduction of hydrogen chloride had ceased. The reaction mixture set up solid with a bright yellow precipitate which was collected by filtration and washed successively with absolute ether and chloroform. Thorough washing at this point with chloroform is advantageous since it removes unreacted nitrile from the imidochloride-tin complex. Decomposition of the complex by heating it on the steam bath for 45 minutes with 1.5 liters of 1% hydrochloric acid gave 51.8 g. of the desired aldehyde, contaminated with less than 10% starting nitrile. Purification was effected by chromatography on a silica gel column. The starting nitrile was eluted with 3:2 low boiling petroleum ether-dry benzene. After removal of the nitrile, elution with dry benzene gave 37.2 g. of the pure α-fluoren-9-ylidene-p-tolualdehyde, M.P. 118–121° C.

EXAMPLE 4

2-[p-(fluoren-9-yldenylmethyl)phenacyl]pyridine

Phenyl lithium was prepared by the treatment of 7.46 g. of cut-up lithium wire under 575 ml. of absolute ether with 84.4 g. of bromobenzene in 125 ml. of absolute ether. The addition of the bromobenzene solution, dropwise with stirring over a one-hour period, was followed by 1.5 hours of reflux. α-picoline (50.1 g.) in 125 ml. of absolute ether was then run in over a half-hour period, and refluxing was continued another 1.5 hours. The picolyl lithium solution thus prepared was added over a half-hour period to a vigorously stirred solution of 100.0 g. of α-fluoren-9- ylidene-p-tolunitrile in 2 liters of dry toluene. After an additional half-hour of stirring, the reaction mixture was allowed to stand overnight. The stirred mixture was then treated with 300 ml. of water and then 700 ml. of 10% hydrochloric acid. The organic and aqueous phases were decanted from the solid that formed. The aqueous phase was returned to the flask with the solid, and the mixture was heated on the steam bath with stirring for three hours to hydrolyze the imine to the desired ketone. The mixture was then stirred and cooled in an ice bath and made basic with sodium hydroxide pellets. The alkaline mixture was extracted three times with 500 ml. portions of chloroform. The combined chloroform extracts were washed with water, dried, filtered and evaporated under vacuum. The resultant residue was taken up in 500 ml. of hot butanone, filtered and cooled overnight to give 46.4 g. of crystalline product, M.P. 164–170° C. A second crop, M.P. 140–168° C., of 10.2 g. was obtained by evaporating the mother liquor to 200 ml. and cooling again. The combined crops were dissolved by stirring for several hours at room temperature with 1.5 liters of butanone. About 6 g. of material, 2 - {p-[1-(9-fluorenyl)-2-(2-pyridyl)ethyl]phenacyl}pyridine, failed to dissolve and was removed by filtration. The filtrate was evaporated under vacuum to about 400 ml. and refrigerated overnight to give 45.4 g. of 2 - [p - (fluoren - 9-ylidenylmethyl)phenacyl]pyridine, M.P. 166–170° C. An additional recrystallization from butanone gave material with M.P. 167–170° C. The 6 g. of difficulty soluble bis-pyridyl compound was recrystallized from 600 ml. of butanone to give the purified 2-{p-[1 - (9 - fluorenyl)-2-(2-pyridyl)ethyl]phenacyl}pyridine, M.P. 197–200° C. or 199.5–200° C. on further recrystallization from benzene. Production of this bis-pyridyl product can be optimized by doubling the amount of picolyl lithium used and by using a standard addition of the nitrile to the picolyl lithium solution rather than the inverse.

EXAMPLE 5

α-(α-fluoren-9-ylidene-p-tolyl)-2-pyridineethanol and its hydrochloride salt

A solution of 14.2 g. of 2-[p-(fluoren-9-ylidenylmethyl)phenacyl]pyridine in 800 ml. of 3:1 ethanoltetrahydrofuran was treated with 7.00 g. of sodium borohydride, added in portions with stirring. After being stirred for three hours, the reaction mixture was allowed to stand overnight and was then poured into 2 liters of ice water. The yellow, granulation solid of α-(α-fluoren-9-ylidene-p-tolyl)-2-pyridineethanol was collected by vacuum filtration. Treatment of a butanone solution of the free base with alcoholic hydrogen chloride gave the crystalline hydrochloride salt, M.P. 207–209° C. after recrystallization from ethanol or butanone. Solution of the salt in hot butanone was effected by the addition of a little methanol. Boiling was then continued until the salt began crystallizing out of the hot solution.

Alternatively, α - (α - fluoren-9-ylidene-p-tolyl)-2-pyridineethanol has been obtained by the condensation of 2-picolyl lithium with α-fluoren-9-ylidene-p-toluadehyde by a procedure similar to that described in Example 4 except that the aldehyde is substituted for the nitrile of that example. The latter procedure also produces some doubly alkylated or bis-pyridyl material, α-{p-[1-(9-fluorenyl) - 2-(2-pyridyl)ethyl]phenyl}-2-pyridineethanol, in the manner discussed for bis-pyridyl formation in Example 4. The bis-pyridyl alcohol of this example is also produced by the sodium borohydride reduction of 2-{p-[1-(9-fluorenyl)-2-(2-pyridyl)ethyl]phenacyl}pyridine (of Example 4) according to the reduction procedure discussed in the main body of this example.

EXAMPLE 6

α-(α-fluoren-9-ylidene-p-tolyl)-2-piperidineethanol

A solution of 9.46 g. of α-(α-fluoren-9-ylidene-p-tolyl)-2-pyridineethanol in 200 ml. of dimethylformamide was made strongly acidic with alcoholic hydrogen chloride and subjected to hydrogenation on a Parr apparatus at about 50 p.s.i. in the presence of about 1 g. of platinum oxide catalyst. After 1.5–2 hours, hydrogen uptake ceased at the point corresponding to the uptake of three molar-equivalents of hydrogen. After removal of the catalyst by filtration, the filtrate was poured into 1 liter of crushed ice plus 200 ml. of concentrated aqueous ammonia. The precipitate was collected by filtration and dissolved in 200 ml. of chloroform. The chloroform solution was washed with water, dried, filtered, treated with alcoholic hydrogen chloride and diluted to about 500 ml. with ethyl acetate. Evaporation of the solution on the steam bath until crystallization began, followed by its standing at room temperature, gave 7.14 g. of crystalline, hydrated salt, M.P. 131–140° C. One additional recrystallization from chloroform-ethyl acetate gave acceptably pure α-(α-fluoren - 9-ylidene-p-tolyl)-2-piperidineethanol hydrochloride, M.P. 153–160° C. as collected and 187–202° C. after drying at 140° C./0.5 mm. for 17 hours. The product is taken to be a mixture of the two possible diastereoisomers.

EXAMPLE 7

α-(α-fluoren-9-ylidene-p-tolyl)-1-methyl-3-piperidineethanol dihydrogen citrate

A cooled solution of 40 g. of 3-chloromethyl-1-methylpiperidine hydrochloride in 100 ml. of water was made strongly basic with sodium hydroxide pellets and extracted three times with ether. The combined ether extracts were washed twice with saturated, aqueous sodium chloride solution, dried over magnesium sulfate, filtered and evaporated at 25° C. under vacuum on a rotary evaporator. The pale, yellow residue, 3-chloromethyl-1-methylpiperidine, was stored in the freezer until used. A Grignard reagent of the 3-chloromethyl-1-methylpiperidine was prepared in dry tetrahydrofuran solution with 31.4 g. of the halide and 5.69 g. of magnesium turnings. The halide in 100 ml. of tetrahydrofuran was added dropwise, over a one-hour period, to the magnesium turnings under 100 ml of tetrahydrofuran, with stirring at reflux. After an additional hour at reflux, 600 ml. of dry toluene was added to the Grignard reagent, and solvent was distilled off until the distillation temperature reached 110° C. About 500 ml. of solvent was removed. A 600 ml. toluene solution of 30.2 g. of α-fluoren-9-ylidene-p-tolualdehyde was then added rapidly through the dropping funnel to the reaction mixture. The reaction mixture was heated at reflux for 4.5 hours. The reaction mixture was cooled to room temperature, poured into 600 ml. of 10% aqueous ammonium chloride solution and stirred for one hour. The organic layer was then separated, washed with water, dried, filtered and evaporated with a rotary evaporator on the steam bath under vacuum. The dark amber residue was put on an alumina chromatographic column and eluted with absolute ether. The first band off the column was a ketone, probably resulting from the Grignard reaction on some α-fluoren-9-ylidene-p-tolunitrile present as an impurity in the aldehyde used. The desired carbinol was eluted next. A solution of 14.0 g. of the carbinol in 125 ml. of methanol was treated with 7.0 g. of citric acid and heated to dissolve the acid. Butanone (625 ml.) was added and the solution was evaporated by boiling until it was cloudy. A few drops of methanol were added to clear the solution which was then refrigerated to give 17.4 g. of pale yellow α-(α-fluoren-9-ylidene-p-tolyl)-1-methyl - 3 - piperidineethanol dihydrogen citrate, M.P. 117–120° C.

EXAMPLE 8

3-[p-(fluoren-9-ylidenylmethyl)-phenacyl]-N-methylpiperidine and its hydrochloride salt When the Grignard reagent of Example 7 is added to a toluene solution of α-fluoren-9-ylidene-p-tolunitrile, in place of the α-fluoren-9-ylidene-p-tolualdehyde of that example, and handled in a similar manner, 3-[p-(fluoren-9-ylidenylmethyl)phenacyl)-N - methylpiperidine results, M.P. 83–90° C. from ether or petroleum ether.

The hydrochloride salt of this base was formed with alcoholic hydrogen chloride and recrystallized from chloroform-ethyl acetate to give crystalline material, M.P. 203–205° C.

EXAMPLE 9

1-[p-(fluoren-9-ylidenylmethyl)phenacyl]piperidine hydrobromide

According to the method of L. C. King and G. K. Ostrum, J. Org. Chem. 29 3459 (1964), 4'-fluoren-9-ylidenylmethylacetophenone of Example 2 was treated with cupric bromide in chloroform-ethyl acetate solution to produce p-(fluoren-9-ylidenylmethyl)phenacylbromide, M.P. 123–125.5° C. (from acetone). Material of this melting point is obtained in about 53% yield. It appears to be contaminated with the starting acetophenone derivative, but is satisfactory for use as an intermediate in following synthesis.

A solution of 46.76 g. of the above phenacylbromide in 1600 ml. of dry benzene plus 230 ml. of dry hexane was treated with 10.80 g. of piperidine. The reaction mixture, after brief stirring, was allowed to stand at room temperature for six days. The precipitation of the product began within a few minutes and was probably complete in about two days. The product was collected by filtration (35.12 g., 61% of theory) and recrystallized from methanol. Yield: 24.34 g. of 1-[p-(fluoren-9-ylidenylmethyl)phenacyl]piperidine hydrobromide, M.P. 256.5–260° C.

EXAMPLE 10

α-(α-fluoren-9-ylidene-p-tolyl)-1-piperidineethanol and various salts

In small portions 11.52 g. of 1-[p-(fluoren-9-ylidenylmethyl)phenacyl]piperidine hydrobromide of Example 9 was added to a stirred solution of 3.00 g. of sodium borohydride in 300 ml. of ethanol. After the addition was complete, the mixture was stirred for a half-hour and poured into 1 liter of ice water. The pale yellow, granular precipitate was collected by decantation and washed well with water. The decanted liquors were extracted with ether. The ether extract was washed with water and used to dissolve the previously obtained yellow solid. The ether solution was filtered and evaporated on the steam bath to a volume of about 250 ml. Refrigeration of the ether solution gave a good yield of yellow crystals which were further purified by recrystallization from methanol to give 8.1 g. (85.8% of theory) of α-(α-fluoren-9-ylidene-p-tolyl)-1-piperidineethanol, M.P. 124–127.5° C. Further purification by means of the precipitation of the dihydrogen citrate salt (M.P. 115.5–118.5° C.) from methanol solution and regeneration of the free base with dilute sodium hydroxide gave the free base, M.P. 136–138° C. (from methanol or isopropanol). Other salts prepared were the hydrochloride, M.P. 268.5–269.5° C. from ethanol, and the acid succinate, an oil which would not crystallize from acetone solution.

EXAMPLE 11

α-(α-fluoren-9-ylidene-p-tolyl)-α-methyl-2-pyridineethanol

According to the procedure of Example 4, the same amount of 2-picolyl lithium was prepared and added dropwise over a 30 minute period to a 1.3 liter dry benzene solution of 127.7 g. of 4'-fluoren-9-ylidenylmethylacetophenone of Example 2. The mixture was then heated at reflux, with stirring for 30 minutes, and allowed to stand overnight at room temperature. With stirring, 1.3 liters of saturated ammonium chloride was added. After one hour, the organic layer was separated, washed with water, dried, decolorized with charcoal and evaporated to dryness on the steam bath, under vacuum, with a rotary evaporator. The ketonic starting material was removed from the residual oil by the formation of the hydrochloride salt in absolute ether solution with excess alcoholic hydrogen chloride and regeneration of the free base from the precipitated salt with concentrated ammonia. The product was further purified by being chromatographed twice on alumina columns. Prominent among the impurities was α - {p - [1 - (9-fluorenyl)-2-(2-pyridyl)ethyl]phenyl}-α-methyl-2-pyridineethanol, the production of which could be readily increased by the standard addition of twice the specified amount of picolyl lithium. Impurities were first eluted with dry benzene followed by the product which was eluted with absolute ether. The eluted oil (61.2 g.) was covered with acetonitrile to give yellow button crystals, M.P. 131.5–136° C. Two additional recrystallizations from acetonitrile gave 47.2 g. of α - (α - fluoren - 9 - ylidene-p-tolyl)-α-methyl-2-pyridineethanol, M.P. 138.5–141° C.

EXAMPLE 12

2-[p-(fluoren-9-ylmethyl)phenacyl]pyridine

According to the method of Example 4, 2-picolyl lithium was prepared in absolute ether in the same amount as in that example. The solvent ether was removed by boiling after the addition of 800 ml. of dry benzene. A warm solution of 81.6 g. of α-fluoren-9-yl-p-tolunitrile of Example 1 in 1 liter of dry benzene was added to the hot, stirred picolyl lithium solution over a 10-minute period. The reaction mixture was heated at reflux, with stirring, for 1.5 hours and allowed to stand at room temperature overnight. About 250 ml. of 10% hydrochloric acid was added and stirred with the reaction mixture for two hours. The mixture was then made basic with dilute sodium hydroxide. The organic layer was separated and washed thoroughly with water to remove most of the picoline. The organic layer was dried over sodium sulfate and evaporated on the steam bath, under vacuum, with a rotary evaporator to about 400 ml. Refrigeration gave 38.31 g. of crystalline material, M.P. 132.5–136.5° C. Two further recrystallizations from benzene gave 14.55 g. of material, M.P. 153.5–157° C. Purification by means of precipitation of the hydrochloride salt from ethyl acetate with alcoholic hydrogen chloride, followed by regeneration of the free base with 10% sodium hydroxide and recrystallization of the resultant free base a final time from benzene gave 11.77 g. of 2-[p-(fluoren-9-ylmethyl)phenacyl]pyridine, M.P. 156–157.5 ° C.

EXAMPLE 13

α-(α-fluoren-9-yl-p-tolyl)-2-pyridineethanol

According to the method of Example 5 with 14.2 g. of 2-[p-(fluoren-9-ylmethyl)phenacyl]pyridine being used in place of the 2-[p-fluoren-9-ylidenylmethyl)phenacyl]pyridine of that example, α-(α-fluoren-9-yl-p-tolyl)-2-pyridineethanol was prepared. The yield, after two recrystallizations from benzene, was 7.73 g. of crystalline free base, M.P. 140–141° C.

EXAMPLE 14

4-[p-(fluoren-9-ylmethyl)phenacyl]pyridine 4-picolyl sodium was prepared in 200 ml. of 4-picoline with 10 g. of sodamide according to the method of H. B. Wright, D. A. Dunnigan and U. Biermacher, J. Med. Chem. 7 113 (1964). A solution of 42.2 g. of α-fluoren-9-yl-p-tolunitrile, from Example 1, in 600 ml. of 4-picoline was added rapidly to the ice-cooled picolyl sodium solution. The reaction mixture was allowed to warm to room temperature and was then stirred for 2.5 hours. It was found advantageous at this point to remove a small portion of the reaction mixture, pour it into water and investigate the infrared spectrum of the resulting oil. If the nitrile absorption at 2220 cm.$^{-1}$ was all gone, the reaction mixture was worked up. If there was still some absorption at 2220 cm.$^{-1}$, the reaction mixture was cooled down in an ice bath, treated with an additional 10 g. portion of sodamide and stirred overnight at room temperature. At the end of the reaction, the mixture was poured into 4 liters of water and allowed to separate. The supernatent water was decanted from the precipitated oil and replaced with 4 liters of fresh water. On standing overnight, the oil, which was considered to be the imine corresponding to the desired ketone, crystallized and was collected by decantation. The crystals were covered with 600 ml. of 5% hydrochloric acid and heated on the steam bath to hydrolyze. After 30 minutes, the solid was completely in solution. The solution was cooled, made basic with 10% sodium hydroxide and extracted with chloroform. The combined chloroform extracts were washed with water thoroughly, dried and evaporated on the steam bath, under reduced pressure, with a rotary evaporator to give 64.6 g. of a pale amber oil. Crystallization of the oil from benzene gave 43.7 g. of material, M.P. 100.5–109.5° C. Recrystallization of this material from ether twice gave 18.33 g. of 4-[p-(fluoren-9-yl-methyl)phenacyl]pyridine, M.P. 125–127° C.

EXAMPLE 15

α(α-fluoren-9-yl-p-tolyl)-4-pyridineethanol

To a solution of 2.50 g. of sodium borohydride in 300 ml. of ethanol was added 13.60 g. of 4-[p-(fluoren-9-yl-methyl)-phenacyl]pyridine with stirring. After two hours of stirring, the yellow color of the reaction mixture was completely bleached. The mixture was diluted to 1 liter with water to give a granular white precipitate, 13.0 g., M.P. 173.5–176.5° C. Recrystallization from benzene gave 12.5 g. of α-(α-fluoren-9-yl-p-tolyl)-4-pyridineethanol, M.P. 175–176.5° C.

EXAMPLE 16

α-(α-fluoren-9-ylidene-p-tolyl)-2-pyridinemethanol

A solution of 7.9 ml. of 2-bromopyridine in 30 ml. of absolute ether was added dropwise, with stirring, to a cooled (−60° C.) solution of an equivalent amount of commercial n-butyl lithium in 500 ml. of absolute ether. The reaction mixture was then allowed to warm to −35° C. at which temperature it was stirred for 15 minutes. The resulting 2-pyridyl lithium solution was cooled to −65° C. and treated with a solution of 23.2 g. of a α-fluoren-9-ylidene-p-tolualdehyde in 500 ml. of dry toluene. The tolualdehyde was added dropwise with stirring over a 25-minute period. The reaction solution was allowed to warm to 10° C. at which point 125 ml. of saturated ammonium chloride solution was added. After standing overnight, the organic layer was separated, washed with water, dried over sodium sulfate and evaporated under reduced pressure on a rotary evaporator. The residual oil was dissolved in about 300 ml. of ethyl acetate and treated with excess alcoholic hydrogen chloride solution. The supernatant liquid was decanted from the semi-solid precipitated salt. The salt was covered with chloroform and made basic with dilute sodium hydroxide. The chloroform solution of the free base was washed with water, dried and evaporated to give 4.7 g. of an amber oil. The oil was chromatographed on an alumina column, giving a mobile yellow band readily eluted with absolute ether, plus another yellow band eluted with stock ether containing 5% methanol. Material from the second band, weight 2.5 g., crystallized on standing under low boiling petroleum ether, to give pale yellow α-(α-fluoren-9-ylidene-p-tolyl)-2-pyridinemethanol, M.P. 103.5–107° C.

The use of either 3- or 4-picolyl sodium (prepared according to the method of Wright et al., cited in Example 14) to alkylate either α-fluoren-9-ylidene-p-tolunitrile or α-fluoren-9-ylidene-p-tolualdehyde gives largely doubly alkylated or bis-pyridyl compounds. For example, the use of the above starting materials in the procedure of Example 14 has given the following results:

| Starting Materials | Products |
| --- | --- |
| α-fluoren-9-ylidene-p-tolunitrile + 4-picolyl sodium | 4-{p-[1-(9-fluorenyl)-2-(4-pyridyl) ethyl]-phenacyl} pyridine, M.P. 115.5–120° C. before purification. |
| α-fluoren-9-ylidene-p-tolunitrile + 3-picolyl sodium | 3-{p-[1-(9-fluorenyl)-2-(3-pyridyl) ethyl]-phenacyl}pyridine. |
| α-fluoren-9-ylidene-p-tolualdehyde plus 4-picolyl sodium | α-{p-[1-(9-fluorenyl)-2-(4-pyridyl) ethyl]-phenyl}-4-pyridine-ethanol, M.P. 209.5–215.5° C. (mixture of two diastereoisomeric pairs). |

TABLE I

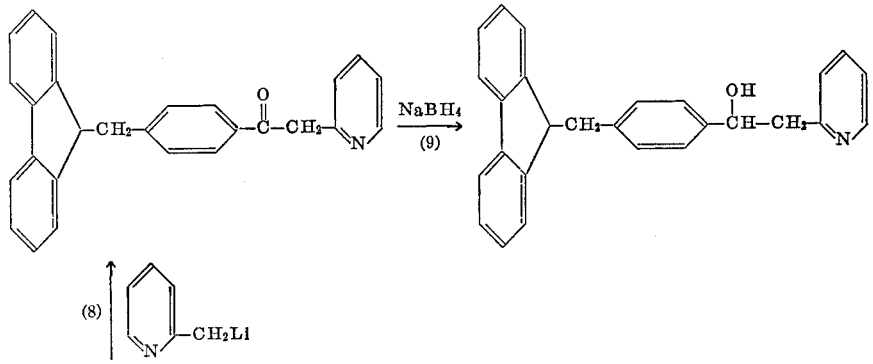

3,481,929
13  14
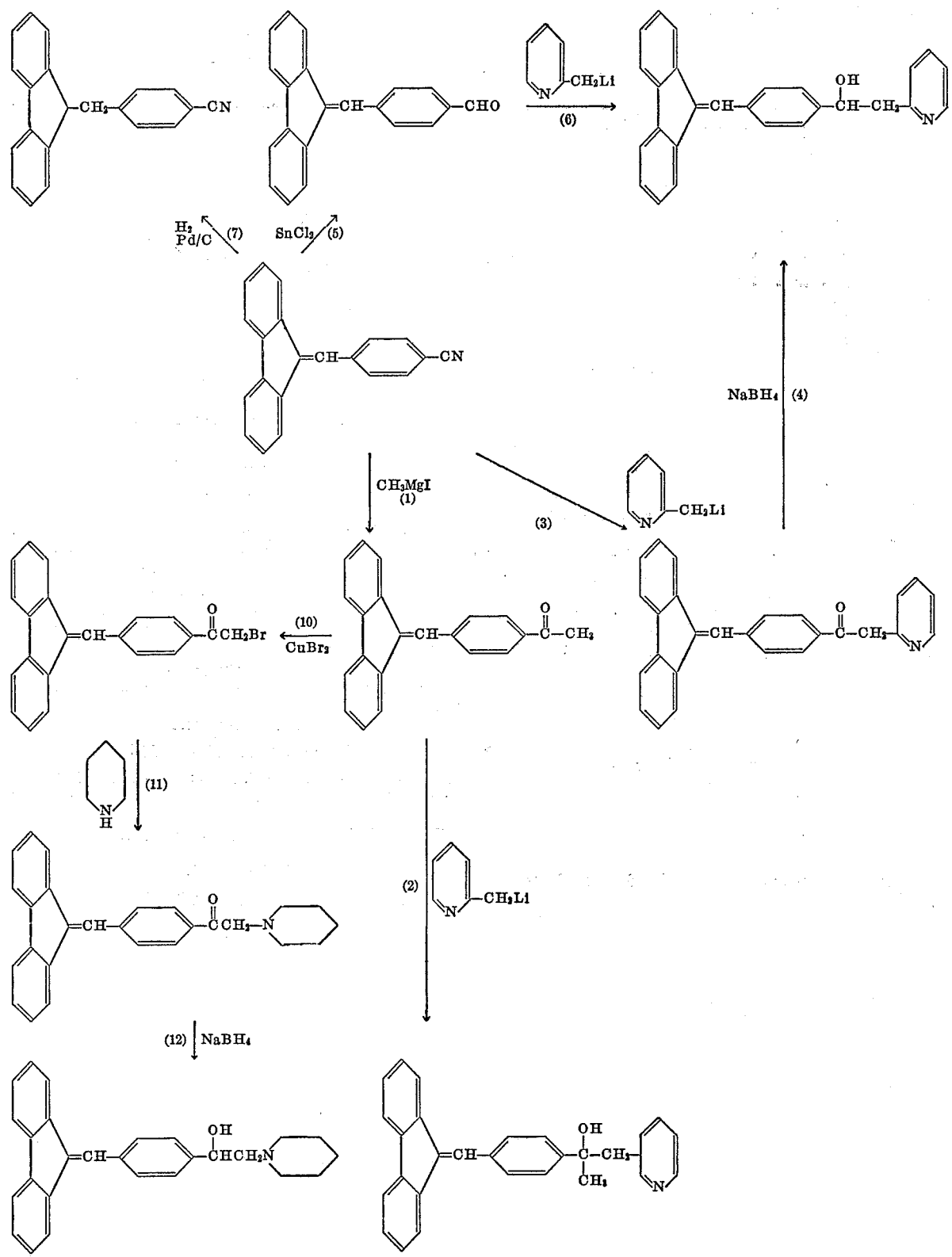

What is claimed is:

1. A compound of the formula

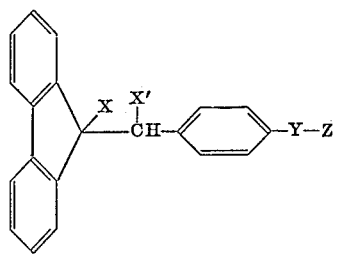

wherein:
(a) each of X and X' is hydrogen or X and X' together form a bond between the carbon atoms to which they are attached;
(b) Y is an oxygenated carbon fragment chosen from

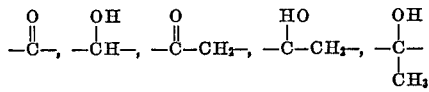

or

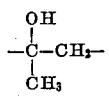

in which the carbon bearing the oxygen is attached to the phenyl ring;
(c) Z is (1) pyridyl or N-(lower alkyl)piperidyl attached to Y through a ring carbon atom or (2) piperidyl attached to Y through a ring carbon atom or the nitrogen atom; or a pharmacologically acceptable acid addition salt thereof.

2. A compound of claim 1 represented by the formula:

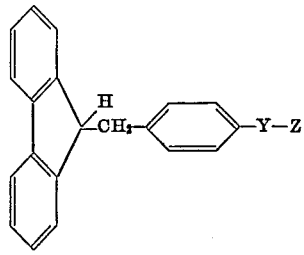

or a pharmacologically acceptable acid addition salt thereof.

3. A compound of claim 2 wherein Y is

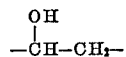

4. A compound of claim 1 represented by the formula

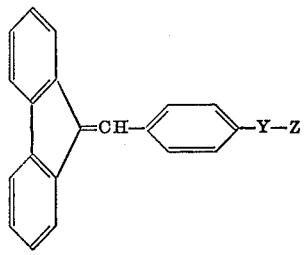

or a pharmacologically acceptable acid addition salt thereof.

5. A compound of claim 4 wherein Y is

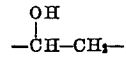

6. α-(α-fluoren-9-yl-p-tolyl)-2-pyridineethanol or a pharmacologically acceptable acid addition salt thereof.

7. α-(α-fluoren-9-ylidene-p-tolyl)-2-pyridineethanol or a pharmacologically acceptable acid addition salt thereof.

8. α-(α-fluoren-9-ylidene-p-tolyl)-2-piperidineethanol or a pharmacologically acceptable acid addition salt thereof.

9. α-(α-fluoren-9-ylidene-p-tolyl)-1-methyl-3-piperidineethanol or a pharmacologically acceptable acid addition salt thereof.

References Cited

UNITED STATES PATENTS 3,178,420  4/1965  Palopoli et al. _____ 260—240
3,335,148  8/1967  Krumkalns _____ 260—297

JOHN D. RANDOLPH, Primary Examiner

U.S. Cl. X.R.
260—294.7, 297, 465, 591, 599, 999